United States Patent [19]

Kikuta et al.

[11] Patent Number: 5,677,365
[45] Date of Patent: Oct. 14, 1997

[54] AQUEOUS RESIN DISPERSION FOR HEAT-SENSITIVE RECORDING MATERIAL AND HEAT-SENSITIVE RECORDING MATERIAL USING THE SAME

[75] Inventors: Teruo Kikuta, Nagaokakyo; Katsuyuki Kono, Takatsuki, both of Japan

[73] Assignee: Nippon Shokubai Co., Ltd., Osaka, Japan

[21] Appl. No.: 190,896

[22] Filed: Feb. 3, 1994

[30] Foreign Application Priority Data

Feb. 3, 1993 [JP] Japan ................... 5-016565

[51] Int. Cl.$^6$ ................................... C08L 83/00
[52] U.S. Cl. ............ 523/201; 524/458; 524/459; 524/503; 526/202
[58] Field of Search ........... 524/459, 503, 524/458; 523/201; 526/202

[56] References Cited

U.S. PATENT DOCUMENTS

| | | | |
|---|---|---|---|
| 4,814,373 | 3/1989 | Frankel et al. | 524/458 X |
| 4,877,688 | 10/1989 | Senoo et al. | |
| 5,100,949 | 3/1992 | Takahashi et al. | 524/459 |
| 5,104,914 | 4/1992 | Elton et al. | 524/459 X |
| 5,185,387 | 2/1993 | Klesse et al. | 523/201 |
| 5,200,459 | 4/1993 | Weih et al. | 524/459 |
| 5,216,044 | 6/1993 | Hoshino et al. | 523/201 |
| 5,256,619 | 10/1993 | Yoshida et al. | |
| 5,273,824 | 12/1993 | Hoshino et al. | 523/201 X |
| 5,284,900 | 2/1994 | Izubayashi et al. | |
| 5,306,743 | 4/1994 | Klesse et al. | 523/201 |
| 5,306,744 | 4/1994 | Wolfersberger et al. | 523/201 |
| 5,344,675 | 9/1994 | Snyder | 523/201 X |
| 5,391,608 | 2/1995 | Mudge et al. | 523/201 X |
| 5,405,879 | 4/1995 | Uemae et al. | 523/201 |
| 5,409,971 | 4/1995 | Wolfersberger et al. | 523/201 |

FOREIGN PATENT DOCUMENTS

| | | | |
|---|---|---|---|
| 0055559 | 7/1982 | European Pat. Off. | 524/459 |
| 0199859 | 11/1986 | European Pat. Off. | |
| 0464828 | 1/1992 | European Pat. Off. | |
| 0516360 | 12/1992 | European Pat. Off. | 524/459 |
| 3738215 | 5/1988 | Germany | 524/459 |
| 3843681 | 7/1989 | Germany | |
| 2028202 | 1/1990 | Japan | 524/459 |
| 2034671 | 2/1990 | Japan | 523/201 |
| 3037203 | 2/1991 | Japan | 524/459 |
| 0081405 | 3/1992 | Japan | 524/459 |
| 4117429 | 4/1992 | Japan | 523/201 |
| 4306273 | 10/1992 | Japan | 523/201 |
| 0593304 | 11/1977 | Switzerland | 524/459 |
| 1171468 | 8/1985 | U.S.S.R. | 524/459 |

*Primary Examiner*—Judy M. Reddick
*Attorney, Agent, or Firm*—Oblon, Spivak, McClelland, Maier & Neustadt, P.C.

[57] ABSTRACT

An aqueous resin dispersion for a heat-sensitive recording material is disclosed. The aqueous resin dispersion is obtained by the use of polyvinyl alcohol as an emulsifier and the use of two steps of polymerization. In the first step of polymerization, a polymeric monomer composition A is polymerized, composition A containing polymeric multi-functional monomers which constitute 15% by weight or more of the total weight of the polymeric monomers used for the first step. And, in the second step, a polymeric monomer composition B is polymerized. The invention also discloses a heat-sensitive recording material using such an aqueous resin dispersion as a color-developing layer or a protective coating.

6 Claims, No Drawings

AQUEOUS RESIN DISPERSION FOR HEAT-SENSITIVE RECORDING MATERIAL AND HEAT-SENSITIVE RECORDING MATERIAL USING THE SAME

BACKGROUND OF THE INVENTION

1. Field of the Invention

The present invention relates to a aqueous resin dispersion for a heat-sensitive recording material and to a heat-sensitive recording material using the same.

2. Description of the Related Art

These days, a heat-sensitive recording material having a dyestuff-type heat-sensitive color-developing layer obtained by a combination of a leuco dye and a phenolic acidic substance is widely used for printing paper of various thermal printers such as facsimiles, medical printing, POS (point of sales system), handy terminals, ticket issuing system, measuring instruments, etc.

In view of the above background, various proposals have been made concerning a binder resin for a heat-sensitive recording material and a resin for forming a protective coating. Polyvinyl alcohol is now generally used as a heat-sensitive recording material resin. It is used together with a considerable amount of pigments, such as calcium carbonate, kaolin, with a view to improving sticking resistance, and consequently, it has defects relating to characteristics of transparency, color-developing, water resistance, plasticizer resistance, and the like, particularly when polyvinyl alcohol is used for a protective coating. Also, even though the concentration of polyvinyl alcohol is low, the viscosity thereof is still high, and therefore, it does not have good drying and coating characteristics, thus inhibiting more speedy coating and resulting in poor productivity.

In order to solve the above various problems, a heat-sensitive recording material provided with a protective coating containing a special type of crosslinked microfine particles was already disclosed by the present inventor (U.S. Pat. No. 5,256,619). In accordance with a wider variety of uses for a heat-sensitive recording material, however, further improvement of the characteristics of the above heat-sensitive recording material is becoming increasingly demanded.

SUMMARY OF THE INVENTION

Accordingly, an object of the present invention is to provide an aqueous resin dispersion for a heat-sensitive recording material which brings about a color-developing layer or a protective coating with high performance, and also to provide a heat-sensitive recording material including a color-developing layer or a protective coating which excels in characteristics such as stability of background, which means that the color-developing layer of heat-sensitive recording material does not change when the heat-sensitive material is made or with time afterwards, water resistance, sticking resistance, print color-developing, plasticizer resistance, and the like, by the use of the same dispersion.

In order to achieve the above object, the present invention provides an aqueous resin dispersion for a heat-sensitive recording material, the dispersion using one of polyvinyl alcohol and modified polyvinyl alcohol as an emulsifier, the polyvinyl alcohol and modified polyvinyl alcohol having a degree of polymerization within a range from 300 to 2400 and a saponification rate of 80% or more, one of the polyvinyl alcohol and modified polyvinyl alcohol constituting from 10 to 250% by weight of the total weight of polymeric monomers, the aqueous resin dispersion being obtained by two-step polymerization wherein in the first step, a polymeric monomer composition A is polymerized, the composition A containing polymeric multifunctional monomers which constitute 15% by weight or more of the total weight of the polymeric monomers used for the first step, and wherein in the second step, a polymeric monomer composition B is polymerized.

The invention also includes a heat-sensitive recording material provided with a heat-sensitive color-developing layer on a base of the material, the color-developing layer using the above dispersion as a binder. The invention further includes a heat-sensitive recording material provided with a color-developing layer on a base of the material and with a protective coating on the color-developing layer or a color-developing layer commonly used, the protective coating using the above dispersion.

DETAILED DESCRIPTION OF THE INVENTION

The present inventors found that the use of polyvinyl alcohol as an emulsifier and the use of the following two-step polymerization process can accomplish the above object and they completed the present invention.

In the first step, the polymeric monomer composition A is polymerized. The composition A contains the polymeric multifunctional monomers which constitute 15% by weight or more of the total weight of the polymeric monomers used for the first step.

In the second step, the polymeric monomer composition B is polymerized. Thereafter, a core-shell type aqueous resin dispersion is obtained and is used as a resin for forming a surface layer of the heat-sensitive recording material.

The present invention will now be described in detail. When an aqueous resin dispersion for a heat-sensitive recording material is produced, it is essential that polyvinyl alcohol or modified polyvinyl alcohol having a degree of polymerization from 300 to 2400 [both of them may be hereinafter generically referred to as (modified) polyvinyl alcohol] is used as an emulsifier. Because the emulsifier used for an ordinary emulsion are often constructed such that the hydrophilic group is a carboxyl group, a sulfonic acid group, polyethylene glycol, or the like, and they have a molecular weight within a range from several hundreds to several thousands, most of such emulsifier, therefore, lack stability of back-ground. On the other hand, polyvinyl alcohol is generally used as a resin for heat-sensitive recording materials and has good stability of background. It is also known that this polyvinyl alcohol has emulsifying activity, though it is weak. The present inventors repeatedly studied emulsion polymerization using polyvinyl alcohol and, as a result, they found that it is possible to obtain a heat-sensitive recording material resin which has good stability of polymerization, maintains good stability of background, and has well-balanced physical properties, by using polyvinyl alcohol having the following degree of polymerization and saponification rate as an emulsifier.

The degree of polymerization of the (modified)polyvinyl alcohol is first set within a range from 300 to 2400. The use of the (modified) polyvinyl alcohol having a degree of polymerization of 550 or more results in the heat-sensitive recording material resin having better sticking resistance. If a degree of polymerization is less than 300, a protective coating and a color-developing layer of the heat-sensitive recording material obtained by using the above dispersion have lower heat resistance. On the other hand, if it is more than 2400, the viscosity of the dispersion becomes considerably high and causes gelation in the course of polymerization.

The saponification rate of the (modified) polvinyl alcohol is set at 80% or more. Less than 80% of the saponification rate gives rise to increasing viscosity and gelation of the dispersion polymer in the course of polymerization. The more preferable saponification rate is 88% or more.

According to the present invention, emulsion polymerization is performed using the above (modified) polyvinyl alcohol as an emulsifier. The suitable amount of such (modified) polyvinyl alcohol is from 10 to 250% by weight of the total weight of polymeric monomers. If the emulsifier is less than 10% by weight, numerous suspension polymers which are large in particle size are produced, coagulate and precipitate in an aqueous medium, and thus, such an emulsifier is not suitable for an aqueous resin dispersion for a heat-sensitive recording material. On the other hand, 250% by weight or more of the emulsifier considerably lowers sticking resistance. The more preferable amount is a range from 20 to 200% by weight of the total weight of the monomers. The use of the emulsifier within this range results in an aqueous resin dispersion for a heat-sensitive recording material having well-balanced physical properties.

According to the present invention, the polymerization reaction is performed in two steps. In the first step, a polymeric monomer composition A is polymerized. The composition A contains polymeric multi-functional monomers which constitute 15% or more by weight of the total weight of the polymeric monomers used for the first step. Thus, highly-crosslinked microfine particles are obtained. They do not show sharp endthermic peak when the glass transition temperature is measured by a heat compensation-type differential scanning calorimeter, and consequently, they have good heat resistance. Such particles are used as a core of a core-shell type particles, thereby serving the function of improving the sticking resistance of the color-developing layer and the protective coating of the heat-sensitive recording material. If the polymeric multi-functional monomers are less than 15%, the above effect of improving sticking resistance cannot be exerted.

As polymeric multi-functional monomer usable for synthesis of crosslinked microfine particles may be cited, among others, multi-functional (meth)acrylates having more than one polymeric unsaturated groups in the molecule such as multi-esterification [e.g. di-, triesterification or more] products of (meth)acrylic acid with polyhydric alcohols such as ethyleneglycol, 1,3-butyleneglycol, diethyleneglycol, 1,6-hexanediol, neopentylglycol, polyethyleneglycol, propyleneglycol, polypropyleneglycol, neopropyleneglycol, trimethylolpropane, pentaerythritol and dipentaerythritol; (meth)acrylamides having more than one polymeric unsaturated groups in the molecule such as methylenebis(meth) acrylamide; multi-functional allyl compounds having more than one polymeric unsaturated groups in the molecule such as diallylphthalate, diallylmaleate and diallylfumlate; allyl (meth)acrylate and divinylbenzene, any one or more than one thereof in combination.

As another monomer usable for synthesis of crosslinked microfine particles may be cited, styrene derivatives [e.g. styrene, vinyltoluene, α-methylstyrene, chloromethylstyrene, etc.]; (meth)acrylamide derivatives [e.g. (meth)acrylamide, N-monomethyl(meth)acrylamide, N-monoethyl(meth)acrylamide, N,N-dimethyl(meth) acrylamide, etc.]; (meth)acrylate such as esterification products of $C_1$–$C_{18}$ alcohols with (meth)acrylic acids such as methyl(meth)acrylate, ethyl(meth)acrylate, butyl(meth) acrylate; hydroxy group-containing (meth)acrylate such as 2-hydroxyethyl(meth)acrylate, 2-hydroxypropyl(meth) acrylate and monoesters of (meth)acrylic acid and polypropyleneglycol; vinylacetate, (meth)acrylonitrile; polymerizable basic monomers, such as dimethylaminoethyl(meth) acrylate, dimethylaminoethyl(meth)acrylamide, dimethylaminopropyl(meth)acrylamide, vinylpyridine, vinylimidazole and vinylpyrrolidone; crosslinkable (meth) acrylamide, such as N-methylol(meth)acrylamide and N-butoxymethyl(meth)acrylamide; monomers are having hydrolyzable silicon group directly bound to the silicon atom, such as vinyltrimethoxysilane, vinyltriethoxysilane, γ-(meth)-acryloyloxypropyltrimethoxysilane, vinyltris(2-methoxyethoxy)silane and allyltriethoxysilane; epoxy group-containing monomers, such as glycidylacrylate, allylglycidyl ether; oxazolinyle group-containing monomers, such as 2-isopropenyl- 2-oxazoline and 2-vinyloxazoline; aziridine group-containing monomers, such as 2-aziridinylethyl(meth)acrylate and (meth) acryloylaziridine; vinylfluoride, vinylidenefluoride, vinylchloride and vinylidenechloride. These may be used either singly or in the form of a mixture of two or more. In order to obtain the highly-crosslinked microfine particles having substantially no glass transition temperature, it is preferable to select a polymeric monomer composition A such that when a polymer made of polymeric monomers other than polymeric multi-functional monomers is produced, the glass transition temperature of such a polymer is 70° C. or higher, and more preferably, 90° C. or higher. It is known that the glass transition temperature of a copolymer is dependent upon that of a homopolymer formed of a plurality of monomers and the molar ratio of the copolymer. If the glass transition temperature of the above polymer is lower than 70° C., the core portion of the polymer according to the present invention may in some cases fail to result in highly-crosslinked microfine particles which have sufficient heat resistance and have substantially no glass transition temperature, even when the polymeric multi-functional monomers described above are added and the resulting polymeric monomer composition A is polymerized.

Subsequently, in the second step of the polymerization reaction, a polymeric monomer composition B is polymerized. The polymeric monomer composition B is used for improving the film-forming characteristics of the aqueous resin dispersion for a heat-sensitive recording material, and also improving the water resistance, flexibility and smoothness after such dispersion is coated. The lowest temperature in forming a film of the aqueous resin dispersion is preferably not higher than 80° C. Hence, the monomer composition B should be selected such that the glass transition temperature of the monomer composition B after polymerization is not higher than 90° C., and more profitably, not higher than 70° C. If the glass transition temperature of the monomer composition B after polymerization is 90° C. or higher, the above lowest temperature in forming a film may sometimes exceed 80° C.

The specific examples of the polymeric monomer composition B similar to those of the foregoing polymeric monomer composition A may be given by way of examples which are usable monomers other than the polymeric multi-functional monomers. These monomers may be used either individually or in the form of a mixture of two or more. Further, the polymeric multi-functional monomers described above may be used together with the above monomers as long as the lowest temperature in forming a film of the aqueous resin dispersion does not exceed 80° C.

There is no particular limitation concerning a method of adding polymeric monomers to the polymerization reaction system. Methods such as the one-step adding method, monomer dropping method, pre-emulsion method, power feed method, seed polymerization method, multi-step adding method, and the like, may be used for the polymerization in both first and second steps.

A known polymerization catalyst may be used for emulsion polymerization in the present invention: for example, persulfate salts, such as potassium persulfate, ammonium persulfate, sodium persulfate; water-soluble azo-type compounds, such as 2,2'-azobis (2-amidinopropane) dichlorate, 4,4'-azobi(4-cyanopentanoic acid); that is, a substance which decomposes by heat and generates a molecule having a radical; redox-type polymerization initiators, such as hydrogen peroxide, ascrobic acid and hydrogen peroxide, sodium sulfoxylate and t-butylhydroperoxide, potassium persulfate and metallic salt, which generate a molecule having a radical through a redox reaction by combining oxidizing and reducing agents. These materials may be used either individually or in the form of a mixture of two or more. The polymerizing temperature is preferably from 0° to 100° C., and more preferably, from 50° to 80° C. The polymerizing time is preferably from 3 to 15 hours. It is possible to add a hydrophilic solvent or an additive in the course of emulsion polymerization as long as it does not adversely influence the physical properties of the aqueous resin dispersion for a heat-sensitive recording material of the present invention.

The polymer in the aqueous resin dispersion for the heat-sensitive recording material of the present invention often results in a core-shell construction by the two-step polymerization, the construction in which the highly-crosslinked portion made of the monomer composition A is the core and the monomer composition B is the shell. Although the present invention is not limited to the core-shell construction, such a construction is preferable because the use of such a polymer formed of the core-shell construction improves various characteristics of the coating, in particular, transparency and film-forming performance. This is because the interface between the core and the shell portions is obscure and the irregular reflection of light is eliminated therein, thus improving transparency. Also, a binder component in the shell portion effectively acts on the core particles which do not form a film due to the high crosslinking rate, thereby improving film-forming performance.

The average particle size of the polymer in the aqueous resin dispersion is preferably not more than 500 nm in terms of transparency, and more preferably, not more than 300 nm. The polymer having a particle size of more than 500 nm makes the coating cloudy and opaque.

A description will now be Given of a heat-sensitive recording material using the above aqueous resin dispersion.

Two types of heat-sensitive recording materials of the present invention are available: one type is a heat-sensitive recording material in which the above aqueous resin dispersion is used as a binder for a heat-sensitive color-developing layer and another type is a heat-sensitive recording material in which a protective coating using the above aqueous resin dispersion is formed on a heat-sensitive color-developing layer.

The heat-sensitive recording material of a first type is provided with a heat-sensitive color-developing layer on a base of the material, and can be obtained by the following process. The heat-sensitive color-developing layer contains at least a known leuco dye/s, developer/s, and the aqueous resin dispersion for a heat-sensitive recording material of the present invention. Other components, such as various known additives, auxiliaries described below, may also be added if necessary. The base formed of, for example, paper, a plastic film, synthetic paper, is coated with the above components and dried.

The heat-sensitive color-developing layer formed on the supporting member is obtainable by applying a liquid coating composition prepared by dispersing in a binder known leuco dye/s, developer/s and various additives and/or auxiliaries described below and the like, this followed by drying.

As the aforementioned leuco dyes, known leuco compound may be usable, for example, triphenylmethane-type, fluoran-type, phenothiazine-type, auramine-type, spiropyran-type and indolinophthlide-type. As leuco dyes may be cited such as 3,3-bis(p-dimethylaminophenyl) phthalide, 3,3-bis(p-dimethylaminophenyl)-6-dimethylaminophthalide [Crystal Violet lactone], 3,3-bis(p-dimethylaminophenyl)-5-diethylaminophthalide, 3,3-bis (p-dimethylaminophenyl)-6-chlorophthalide, 3,3-bis(p-dibutylaminophenyl)phthalide, 3-cyclohexylamino-6-chlorofluoran, 3-dimethylamino-5,7-dimethylfluoran, 3-diethylamino-7-chlorofluoran, 3-diethylamino-7-methylfluoran, 3-diethylamino-7,8-benzfluoran, 3-diethylamino-6-methyl-7-chlorofluoran, 3-(N-p-tolyl-N-ethylamino)-6-methyl-7-anilinofluoran, 3-pyrrolidino-6-methyl-7-anilinofluoran, 2-[N-(3'-trifluoromethylphenyl) amino]-6-diethylaminofluoran, 2-[3,6-bis(diethylamino)-9-(o-chloroanilino)xanthylactambenzoate, 3-diethylamino-6-methyl-7-(m-trichloromethylanilino)fluoran, 3-dimethylamino-7-(o-chloroanilino)fluoran, 3-dibutylamino-7-(o-chloroanilino)fluoran, 3-N-methyl-N-amylamino-6-methyl-7-anilinofluoran, 3-N-methyl-N-cyclohexylamino-6-methyl-7-anilinofluoran, 3-diethylamino-6-methyl-7-anilinofluoran, 3-(N,N-diethylamino)-5-methyl-7-(N,N-dibenzylamino)fluoran, benzoilleucomethyleneblue, 6'-chloro-4'-methoxy-benzoindolinopyrylospiran, 5'-bromo-3'-methoxy-benzoindolinopyrylospiran, 3-(2'-hydroxy-4'-dimethylaminophenyl)-3-(2'-methoxy-5'-chlorophenyl) phthalide, 3-(2'-hydroxy-4'-dimethylaminophenyl)-3-(2'-methoxy-5'-nitrophenyl)phthalide, 3-(2'-hydroxy-4'-diethylaminophenyl)-3-(2'-methoxy-5'-methylphenyl) phthalide, 3-(2'-methoxy-4'-dimethylaminophenyl)-3-(2'-hydroxy-4'-chloro-5'-methylphenyl)phthalide, 3-morpholino-7-(N-propyl-trifluoromethylanilino)fluoran, 3-pyrrolidino-7-trifluoromethylanilinofluoran, 3-diethylamino-5-chloro-7-(N-benziltrifluoromethylanilino)fluoran, 3-pyrrolidino-7-(di-p-chlorophenyl)methylaminofluoran, 3-diethylamino-5-chloro-7-(α-phenylethylamino)fluoran, 3-(N-ethyl-p-toluidino)-7-(α-phenylethylamino)fluoran, 3-diethylamino-7-(α-methoxycarbonylphenylamino)fluoran, 3-diethylamino-5-methyl-7-(α-phenylethylamino)fluoran, 3-diethylamino-7-piperidinofluoran, 2-chloro-3-(N-methyltoluidino)-7-(p-n-butylanilino)fluoran, 3-(N-benzil-N-cyclohexylamino)-5,6-benzo-7-α-naphtylamino-4'-bromofluoran, 3-diethylamino-6-methyl-7-mesitydino-4',5'-benzofluoran.

As the aforementioned developers to be incorporated in the liquid coating composition are chemicals which act to develop the aforementioned leuco dyes through reaction therewith under heating may be used, for example, phenolic compounds, organic or inorganic substances or their esters and salts. For examples, gallic acid, salicylic acid, 3-isopropylsalicylic acid, 3-cyclohexylsalicylic acid, 3,5-di-tert-butylsalicylic acid, 3,5-di-α-methylbenzylsalicylic acid, 4,4'-isopropylidenediphenol, 4,4'-isopropylidenebis(2-chlorophenol), 4,4'-isopropylidenebis(2,6-dibromophenol), 4,4'-isopropylidenebis(2,6- dichlorophenol), 4,4'-isopropylidene bis(2-methylphenol), 4,4'-isopropylidenebis (2,8-dimethylphenol), 4,4'-isopropylidenebis(2-tert-butylphenol), 4,4'-sec-butylidenediphenol, 4,4'-cyclohexylidenebis(2-methylphenol), 4-tert-butylphenol, 4-phenylphenol, 4-hydroxydiphenoxide, α-naphtol, β-naphtol, 3,5-xylenol, thymol, methyl-4-hydroxybenzoate, 4-hydroxyacetophenone, novolak-type-phenolic resin, 2,2'-thiobis(4,6-dichlorophenol), catechol, resorcine, hydroquinone, pyrogallol and phloroglycinecarboxylic acid, 4-tert-octylcatechol, 2,2'-methylenebis(4-chlorophenol), 2,2'-methylenebis(4-methyl-6-tert-butylphenol), 2,2'-dihydroxydiphenyl, p-hydroxyethylbenzoate, p-hydroxypropylbenzoate, p-hydroxybutylbenzoate, p-hydroxybenzylbenzoate, p-hydroxybenzoate-p-chlorobenzyl, p-hydroxybenzoate-o-chlorobenzyl, p-hydroxybenzoate-p-methylbenzyl, p-hydroxybenzoate-n-octyl, benzoic acid, zinc salicylate, 1-hydroxy-2-naphtoic acid, 2-hydroxy-5-naphtoic acid, 2-hydroxy-6-zinc naphtoate, 4-hydroxydiphenylsulfone, 4-hydroxy-4'-chlorodiphenylsulfone, bis(4-hydroxyphenyl)sulfide, 2-hydroxy-p-toluic acid, 3,5-di-tert-butylzinc salicylate, 3,5-di-tert-butyltin salicylate, tartaric acid, oxalic acid, maleic acid, citric acid, succinic acid, stearic acid, 4-hydroxyphthalic acid, boric acid and thiourea derivatives may be usable.

As stated above, in addition to leuco dye/s, a developer/s and the aqueous resin dispersion for a heat-sensitive recording material of the present invention, generally-used additives may be added if necessary: for example, sensitizer/s, pigment/s, lubricant/s, water-soluble or aqueous resins, surface active agents and water-resisting agents (crosslinking agents).

Various thermofusing substances may be used as a sensitizer: for example, higher fatty acids, such as stearic acid, behenic acid, or esters, amides, or metallic salts of these acids. Sensitizers may further include a mixture of aromatic carboxylic acid and amine, benzoic acid phenyl esters, p-benzyl bisphenyl, tarphenyl, triphenylmethane, p-benzyloxy benzyl benzoate, β-benzyloxy naphthalene, β-phenylester naphthoate, 1-hydroxy-2-phenylester naphthoate, 1-hydroxy-2-methylester naphthoate, diphyenyl carbonate, dimethylester terephthalate, 1,4-diethoxynaphthalene, 1,4-benzyloxy naphthalene, 1,2-bis (phenoxy) ethane, 1,2-bis (3-methylphenoxy) ethane, 1,2-bis (4-methylphenoxy) ethane, 1,4-bis (phenoxy) butane, 1,4-bis (phenoxy)-2-butene, 1,2-bis (4-methoxyphenylthio) ethane, benzoylmethane, 1,4-bis (phenylthio)-2-butene, 1,2-bis (4-methoxyphenylthio) ethane, 1,3-bis (2-vinyloxyethoxy) benzene, 1,4-bis (2-vinyloxyethoxy) benzene, p-(2-vinyloxyethoxy) biphenyl, p-allyloxybiphenyl, p-propargyloxybiphenyl, dibenzoyloxymethane, 1,3-dibenzoyloxypropane, dibenzylsulfido, 1,1-diphenylethanol, 1,1-diphenylpropanol, p-(benzyloxy) benzylalcohol, 1,3-diphenoxy-2-propanol, N-octadecylcarbamoyl-p-methoxycarbonyl benzene, N-octadecylcarbamoylbenzene, higher linear glycol, 3,4-epoxy-dialkyl hexahydrophtalate, higher ketone, and other compounds having a melting point of approximately from 50° to 200° C., for example, thermofusing organic compounds.

The pigments include, for example, inorganic microfine powders, such as calcium carbonate, silica, zinc oxide, titanium oxide, aluminum hydroxide, zinc hydroxide, barium sulfate, oxide, clay, talc, surface-treated calcium and silica. The pigments may further include organic microfine powders, such as ureaformaldehyde resin, styrene/methacrylic acid copolymer and polystyrene resin.

Lubricants may include, for example, various waxes, such as carnauba, paraffin, polyethylene; phosphoric alkylesters, silicones; higher fatty acids, such as stearic acid, behenic acid, or esters, amides, metallic salts of these acids; and long-chain alkylesters of (meth) acrylic acid, such as stearyl polyacrylate.

As the water-soluble or aqueous resin, resins generally used as a binder may be used: for example, polyvinyl alcohol; starches and starches derivatives; cellulose derivatives, such as methoxycellulose, hydroxyethylcellulose, carboxymethylcellulose, methylcellulose and ethylcellulose; poly(sodium acrylate), polyvinylpyrrolidone, acrylamide/(meth)acrylate copolymer, acrylamide/(meth)acrylate/(meth)acrylic acid terpolymer, styrene/maleate anhydrous copolymer alkali salt, isobutylene/maleate anhydrous copolymer alkali salt, polyacrylamide, sodium alginate, gelatin, casein, acrylic emulsion, styrene/acrylic copolymer emulsion, styrene/vinyl acetate copolymer emulsion, and styrene/butadiene/styrene (SBS) emulsion.

Even if the above pigments, such as calcium carbonate, are not added to the heat-sensitive recording material at all, or only a slight amount of the pigment is added thereto, it is still possible to obtain a heat-sensitive recording sheet having basic physical properties such as good sticking resistance. Also, the resin coating has high transparency. Thus, the use of the heat-sensitive recording material of the present invention obtained as stated above brings about images which excel in surface gloss, printing concentration and printing quality over the images obtained by using the conventional heat-sensitive recording materials. Further, (modified) polyvinyl alcohol is used as an emulsifier, thus substantially achieving good stability of background which is not attainable by the use of an emulsion polymerized by a commonly-used emulsifier.

The heat-sensitive recording material of a second type is provided with a protective coating using the above aqueous resin dispersion on a color-developing layer. The base can be formed of materials similar to those of the first type. The color-developing layer may be the same as that of the first type or instead, any known color-developing layer may be used. Needless to say, however, the above color-developing layer of the first type is more preferable because images with higher printing concentration and printing quality can be obtained. The known color-developing layers can be obtained by adding the above additives and auxiliaries to the above leuco dye and developer using the above water-soluble resin or aqueous resin as a binder. Then, the base is coated with the thus-obtained color-developing layer and dried.

The protective coating formed on the color-developing layer can be obtained basically by coating and drying the above aqueous resin dispersion for the heat-sensitive recording material according to a known method, and by further calender-treating the dried polymer if necessary. Further, if necessary, in order to adjust the performance and the production, it is possible to add additives, such as the above pigments, lubricants, water-soluble or aqueous resins, surface active agents, water resisting agents (crosslinking agents), thermofusing substances, pH adjusters, viscosity adjusters to the aqueous resin dispersion of the present invention as long as such additives do not adversely influence the performance of the protective coating.

Although there is no particular limitation concerning the thickness of the protective coating, it is preferably in a range from 0.5 to 10 μm, and more preferably, from 1 to 5 μm when the effect and economical features of the present invention are taken into consideration.

Examples of the present invention are given below. These are, however, given for the purpose of illustration only and are by no means intended to limit the scope of the invention. Part and percentage (%) given in the description below mean weight part and weight %, respectively.

EXAMPLE 1

790 parts of ion exchanged water and 80 parts of polyvinyl alcohol PVA-105 manufactured by Kuraray Co., Ltd. having a degree of polymerization of 550 and a saponification rate of 98.5% were charged into a flask equipped with a dripping funnel, stirrer, nitrogen inlet pipe, thermometer and condenser. The mixture was heated to a range between 80° C. and 90° C. under stirring and the polyvinyl alcohol was totally dissolved. After the mixture was cooled to 75° C., 5 parts of 5% aqueous solution of potassium persulfate were added, and thereafter, a mixture of 65 parts of methylmethacrylate and 15 parts of ethyleneglycol dimethacrylate prepared in advance was dropped for 3 hours from the dropping funnel. After the completion of dropping, 5 parts of 2% aqueous solution of potassium persulfate were added as the second catalyst, and subsequently, a mixture of 24 parts of methylmethacrylate, 14 parts of butylacrylate and 2 parts of γ-(methacryloxypropyl) trimethoxysilane prepared in advance was dropped for 1 hour. After the completion of dropping, the temperature was raised to 85° C., stirring was continued for 1 hour and then the temperature was lowered so as to conclude polymerization. Thus, an aqueous resin dispersion (1) for a heat-sensitive recording material having a solid concentration of 19.9% was obtained.

EXAMPLE 2

790 parts of ion exchanged water and 50 parts of polyvinyl alcohol PVA-CST manufactured by Kuraray Co., Ltd. having a degree of polymerization of 1750 and a saponification rate of 96.0% were charged into a flask equipped with a dripping funnel, stirrer, nitrogen inlet pipe, thermometer and condenser. The mixture was heated to a range between 80° C. and 90° C. under stirring and the polyvinyl alcohol was totally dissolved. After the mixture was cooled to 75° C., 5 parts of 5% aqueous solution of 2,2'-azobis (2-amidinopropane) dihydrochloride were added, and thereafter, a mixture of 70 parts of methylmethacrylate and 30 parts of divinylbenzene prepared in advance was dropped for 3 hours from the dropping funnel. After the completion of dropping, 5 parts of 2% aqueous solution of 2,2'-azobis (2-amidinopropane) dihydrochloride were added as the second catalyst, and subsequently, a mixture of 18 parts of methylmethacrylate, 24 parts of ethylacrylate, 6 parts of glycidylmethacrylate and 2 parts of vinyltrimethoxysilane prepared in advance was dropped for 1 hour. After the completion of dropping, the temperature was raised to 85° C., stirring was continued for 1 hour and then the temperature was lowered so as to conclude polymerization. Thus, an aqueous resin dispersion (2) for a heat-sensitive recording material having a solid concentration of 20.0% was obtained.

EXAMPLE 3

790 parts of ion exchanged water and 40 parts of polyvinyl alcohol PVA-224 manufactured by Kuraray Co., Ltd. having a degree of polymerization of 2400 and a saponification rate of 88.0% were charged into a flask equipped with a dripping funnel, stirrer, nitrogen inlet pipe, thermometer and condenser. The mixture was heated to a range between 80° C. and 90° C. under stirring and the polyvinyl alcohol was totally dissolved. After the mixture was cooled to 80° C., 5 parts of 5% aqueous solution of 4,4'-azobis (4-cyanovaleric acid) neutralized with aqueous ammonia were added, and thereafter, a mixture of 80 parts of styrene and 40 parts of trimethylolpropanetrimethacrylate prepared in advance was dropped for 3 hours from the dropping funnel. After the completion of dropping, 5 parts of 2% aqueous solution of 4,4'-azobis (4-cyanovaleric acid) neutralized with aqueous ammonia were added as the second catalyst, and subsequently, a mixture of 24 parts of styrene, 12 parts of butylacrylate and 4 parts of glycidylmethacrylate prepared in advance was dropped for 1 hour. After the completion of dropping, the temperature was raised to 85° C., stirring was continued for 1 hour and then the temperature was lowered so as to conclude polymerization. Thus, an aqueous resin dispersion (3) for a heat-sensitive recording material having a solid concentration 19.8% was obtained.

COMPARATIVE EXAMPLE 1

100 parts of calcium carbonate were added to 100 parts of 3% aqueous solution of polyvinyl alcohol PVA-CST having a degree of polymerization of 1750 and a saponification rate of 96.0%. The resultant mixture was dispersed using a sand mill until the particle size was reduced to 1 μm. Then, 800 parts of 12.1% PVA-CST aqueous solution were added. Thus, a pigment dispersion resin liquid for comparison (1') having a solid concentration of 20.0% was obtained.

COMPARATIVE EXAMPLE 2

100 parts of kaolin were added to 100 parts of 3% aqueous solution of polyvinyl alcohol PVA-CST having a degree of polymerization of 1750 and a saponification rate of 96.0%. The resultant mixture was dispersed using a sand mill until the particle size was reduced to 1 μm. Then, 696 parts of 6.8% PVA-CST aqueous solution and 104 parts of Acryset SC-291 (solid concentration 48%; Acrylic emulsion, manufactured by Nippon Shokubai Co., Ltd.) were added. The resultant mixture was prepared with ion exchanged water so that a pigment dispersion resin liquid for comparison (2') thus obtained had a solid concentration of 20.0%.

COMPARATIVE EXAMPLE 3

100 parts of melamine microfine particle Eposter S-12 manufactured by Nippon Shokubai Co., Ltd. were added to 100 parts of 3% aqueous solution of polyvinyl alcohol PVA-CST having a degree of polymerization of 1750 and a saponification rate of 96.0%. The resultant mixture was dispersed using a sand mill until the particles were separate. Then, 696 parts of 8.9% PVA-CST aqueous solutionand 104 parts of Acryset SC-291 (solid concentration 48%) were added. The resultant mixture was prepared with ion exchanged water so that an aqueous resin dispersion for comparison (3') thus obtained had a solid concentration of 20.0%.

COMPARATIVE EXAMPLE 4

250 parts of a highly-crosslinked microfine particle dispersion containing 30% divinylbenzene (solid concentration 40%), 646 parts of 7.8% aqueous solution of polyvinyl alcohol PVA-CST having a degree of polymerization of 1750 and a saponification rate of 96.0%, and 104 parts of Acryset SC-291 (solid concentration 48%) were mixed. The resultant mixture was prepared with ion exchanged water so that an aqueous resin dispersion for comparison (4') thus obtained had a solid concentration of 20.0%.

COMPARATIVE EXAMPLE 5

790 parts of ion exchanged water and 50 parts of polyvinyl alcohol PVA-CST having a degree of polymerization of 1750 and a saponification rate of 96.0% were charged into a flask equipped with a dropping funnel, stirrer, nitrogen inlet pipe, thermometer and condenser. The mixture was heated to a range between 80° C. and 90° C. under stirring and the polyvinyl alcohol was totally dissolved. After the mixture was cooled to 70° C., 5 parts of 5% aqueous solution of 2,2'-azobis (2-amidinopropane) dihydrochloride were added, and and thereafter a mixture of 90 parts of methylmethacrylate and 10 parts of divinylbenzene prepared in advance was dropped for 3 hours from the dropping funnel. After the completion of dropping, 5 parts of 2% aqueous solution of 2,2'-azobis (2-amidinopropane) dihydrochloride were added as the second catalyst, and subsequently, a mixture of 18 parts of methylmethacrylate, 25 parts of ethylacrylate and 7 parts of glycidylmethacrylate prepared in advance was dropped for 1 hour. After the completion of dropping, the temperature was raised to 85° C., stirring was continued for 1 hour and then the temperature was lowered so as to conclude polymerization. Thus, an aqueous resin dispersion (5') for a heat-sensitive recording material having a solid concentration of 20.0% was obtained.

COMPARATIVE EXAMPLE 6

790 parts of ion exchanged water and 50 parts of polyvinyl alcohol PVA-202 manufactured by Kuraray Co., Ltd. having a degree of polymerization of 200 and a saponification rate of 88.0% were charged into a flask equipped with a dropping funnel, stirrer, nitrogen inlet pipe, thermometer and condenser. The mixture was heated to a range between 80° C. and 90° C. under stirring and the polyvinyl alcohol was totally dissolved. After the mixture was cooled to 70° C., 5 parts of 5% aqueous solution of 2,2'-azobis (2-amidinopropane) dihydrochloride were added, and thereafter, a mixture of 70 parts of methylmethacrylate and 30 parts of divinylbenzene prepared in advance was dropped for 3 hours from the dropping funnel. After the completion of dropping, 5 parts of 2% aqueous solution of 2,2 -azobis (2-amidinopropane) dihydrochloride were added as the second catalyst, and subsequently, a mixture of 18 parts of methylmethacrylate, 25 parts of ethylacrylate and 7 parts of glycidylmethacrylate prepared in advance was dropped for 1 hour. After the completion of dropping, the temperature was raised to 85° C., stirring was continued for 1 hour and then the temperature was lowered so as to conclude polymerization. Thus, an aqueous resin dispersion (6') for comparison having a solid concentration of 19.9% was obtained.

COMPARATIVE EXAMPLE 7

790 parts of ion exchanged water and 160 parts of polyvinyl alcohol PVA-CST having a degree of polymerization of 1750 and a saponification rate of 96.0% were charged into a flask equipped with a dropping funnel, stirrer, nitrogen inlet pipe, thermometer and condenser. The mixture was heated to a range between 80° C. and 90° C. under stirring and the polyvinyl alcohol was totally dissolved. After the mixture was cooled to 70° C., 5 parts of 5% aqueous solution of 2,2'-azobis (2-amidinopropane) dihydrochloride were added, and thereafter, a mixture of 21 parts of methylmethacrylate and 9 parts of divinylbenzene prepared in advance was dropped for 3 hours from the dropping funnel. After the completion of dropping, 5 parts of 2% aqueous solution of 2,2-azobis (2-amidinopropane) dihydrochloride were added as the second catalyst, and subsequently, a mixture of 4 parts of methylmethacrylate, 5 parts of ethylacrylate and 1 part of glycidylmethacrylate prepared in advance was dropped for 1 hour. After the completion of dropping, the temperature was raised to 85° C., stirring was continued for 1 hour and then the temperature was lowered so as to conclude polymerization. Thus, an aqueous resin dispersion (7') for comparison having a solid concentration of 20.0% was obtained.

COMPARATIVE EXAMPLE 8

790 parts of ion exchanged water and 50 parts of polyvinyl alcohol PVA-235 manufactured by Kararay Co., Ltd. having a degree of polymerization of 3600 and a saponification rate of 88.0% were charged into a flask equipped with a dropping funnel, stirrer, nitrogen inlet pipe, thermometer and condenser. The mixture was heated to a range between 80° C. and 90° C. under stirring and the polyvinyl alcohol was totally dissolved. After the mixture was cooled to 70° C., 5 parts of 5% aqueous solution of 2,2'-azobis (2-amidinopropane) dihydrochloride were added, and thereafter, a mixture of 70 parts of methylmethacrylate and 30 parts of divinylbenzene prepared in advance was dropped for 3 hours from the dropping funnel. After the completion of dropping, 5 parts of 2% aqueous solution of 2,2'-azobis (2-amidinopropane) dihydrochloride were added as the second catalyst, and subsequently, a mixture of 18 parts of methylmethacrylate, 25 parts of ethylacrylate and 7 parts of glycidylmethacrylate prepared in advance was dropped for 1 hour. After the completion of dropping, the temperature was raised to 85° C., stirring was continued for 1 hour and then the temperature was lowered.

COMPARATIVE EXAMPLE 9

790 parts of ion exchanged water and 6 parts of polyvinyl alcohol PVA-CST having a degree of polymerization of 1750 and a saponification rate of 96.0% were charged into a flask equipped with a dropping funnel, stirrer, nitrogen inlet pipe, thermometer and condenser. The mixture was heated to a range between 80° C. and 90° C. under stirring and the polyvinyl alcohol was totally dissolved. After the mixture was cooled to 70° C., 5 parts of 5% aqueous solution of 2,2'-azobis (2-amidinopropane) dihydrochloride were added, and thereafter, a mixture of 70 parts of methylmethacrylate and 30 parts of divinylbenzene prepared in advance was dropped for 3 hours from the dropping funnel. After the completion of dropping, 5 parts of 2% aqueous solution of 2,2'-azobis (2-amidinopropane) dihydrochloride were added as the second catalyst, and subsequently, a mixture of 37 parts of methylmethacrylate, 51 parts of ethylacrylate and 8 parts of glycidylmethacrylate prepared in advance was dropped for 1 hour. After the completion of dropping, the temperature was raised to 85° C., stirring was continued for 1 hour and then the temperature was lowered.

COMPARATIVE EXAMPLE 10

790 parts of ion exchanged water and 50 parts of polyvinyl alcohol Gohsenol KM-11 manufactured by the Nippon Synthetic Chemical Industry Co., Ltd. having a degree of polymerization of 1250 and a saponification rate of 77.0% were charged into a flask equipped with a dropping funnel, stirrer, nitrogen inlet pipe, thermometer and condenser. The mixture was heated to a range between 80° C. and 90° C. under stirring and the polyvinyl alcohol was totally dissolved. After the mixture was cooled to 70° C., 5 parts of 5% aqueous solution of 2,2'-azobis (2-amidinopropane) dihydrochloride were added, and thereafter, a mixture of 70 parts of methylmethacrylate and 30 parts of divinylbenzene prepared in advance was dropped for 3 hours from the dropping funnel. After the completion of dropping, 5 parts of 2% aqueous solution of 2,2'-azobis (2-amidinopropane) dihydrochloride were added as the second catalyst, and subsequently, a mixture of 18 parts of methylmethacrylate, 25 parts of ethylacrylate and 7 parts of glycidylmethacrylate prepared in advance was dropped for 1 hour. After the completion of dropping, the temperature was raised to 85° C., stirring was continued for 1 hour and then the temperature was lowered.

The solid concentration, the dispersion particle size and the turbidity of a coating after drying relating to the obtained aqueous resin dispersion (1)–(3) for a heat-sensitive recording material, the pigment dispersion resin liquids for comparison (1') and (2') and aqueous resin dispersion for comparison (3')–(7') were measured by the following device under the following conditions. Table 1 shows the above results and the results of polymerization and dispersion of the above Examples 1–3 and Comparative Examples 1–10.

Solid concentration: 1 g of each sample was placed on an aluminum dish and dried using a hot air dryer. Calculation was made by the discrepancy in weight between before/after drying.

Particle size of 1 μm or less: Measurement was made by the use of a submicron particle size analyzer according to the dynamic light diffusion method, NIKOMP MODEL 370 manufactured by Nozaki & Co., Ltd.

Particle size of 1 μm or more: Measurement was made by the use of the Coulter multisizer of Coulter Electronics Ltd.

Transparency: Turbidity was measured by the use of the turbidimeter ND-1001DP of Nippon Denshoku Kogyo Ltd.

TABLE 1

|  | REFERENCE EXAMPLE | | | COMPARATIVE EXAMPLE | | | | |
| --- | --- | --- | --- | --- | --- | --- | --- | --- |
|  | 1 | 2 | 3 | 1 | 2 | 3 | 4 | 5 |
| POLYVINYL ALCOHOL | | | | | | | | |
| DEGREE OF POLYMERIZATION | 550 | 1750 | 2400 | 1750 | 1750 | 1750 | 1750 | 1750 |
| SAPONIFICATION RATE | 98.5 | 96.0 | 88.0 | 96.0 | 96.0 | 96.0 | 96.0 | 96.0 |
| NUMBER OF PARTS FOR USE | 80 | 50 | 40 | 100 | 50 | 50 | 50 | 50 |
| CORE COMPONENT (PART) | | | | | | | | |
| METHYLMETHACRYLATE | 65 | 70 | | | | | 70 | 90 |
| ETHYLENEGLYCOLDIMETHACRYLATE | 15 | | | | | | | |
| DIVINYLBENZENE | | 30 | | | | | 30 | 10 |
| STYRENE | | | 80 | | | | | |
| TRIMETHYLOLPROPANETRIMETHACRYLATE | | | 40 | | | | | |
| SHELL COMPONENT (PART) | | | | | | | | |
| METHYLMETHACRYLATE | 24 | 18 | | | | | | 18 |
| BUTYLACRYLATE | 13 | | 12 | | | | | |
| γ-(METHACRYROXYPROPYLE) TRIMETHOXYSILANE | 2 | 2 | | | | | | |
| ETHYLEACRYLATE | | 24 | | | | | | 25 |
| GLYCIDYLMETHACRYLATE | | 6 | 4 | | | | | 7 |
| STYRENE | | | 24 | | | | | |
| CROSSLINKED PARTICLES OR PIGMENT (PART) | | | | | | | | |
| CALCIUM CARBONATE | | | | 100 | 100 | | | |
| KAOLIN CLAY | | | | | | | | |
| EPOSTER S-12 | | | | | | 100 | | |
| RESIN DISPERSION LIQUID (PART) ACRYSET SC-291 | | | | | | 104 | 104 | 104 |
| POLYMERIZATION OR DISPERSION RESULT | POLY-MERIZA-TION GOOD | POLY-MERIZA-TION GOOD | POLY-MERIZA-TION GOOD | DISPER-SION GOOD | DISPER-SION GOOD | DISPER-SION GOOD | POLY-MERIZA-TION GOOD | POLY-MERIZA-TION GOOD |
| RESULTANT DISPERSION LIQUID NO. | 1 | 2 | 3 | 1' | 2' | 3' | 4' | 5' |
| SOLID CONCENTRATION (%) | 19.9 | 20.0 | 19.8 | 20.0 | 20.0 | 20.0 | 20.0 | 20.0 |
| DISPERSION PARTICLE SIZE (μm) | 0.28 | 0.35 | 0.37 | 0.98 | 1.25 | 1.21 | 0.16 | 0.26 |
| TURBIDITY OF DRIED COATING | 0.7 | 3.2 | 1.1 | 87.5 | 78.9 | 76.3 | 22.2 | 0.5 |

|  | COMPARATIVE EXAMPLE | | | | |
| --- | --- | --- | --- | --- | --- |
|  | 6 | 7 | 8 | 9 | 10 |
| POLYVINYL ALCOHOL | | | | | |
| DEGREE OF POLYMERIZATION | 200 | 1750 | 3600 | 1750 | 1250 |
| SAPONIFICATION RATE | 88.0 | 96.0 | 88.0 | 96.0 | 77.0 |
| NUMBER OF PARTS FOR USE | 50 | 160 | 50 | 6 | 50 |

TABLE 1-continued

| CORE COMPONENT (PARTS) | | | | | |
|---|---|---|---|---|---|
| METHYLMETHACRYLATE | 70 | 21 | 70 | 70 | 70 |
| ETHYLENEGLYCOLDIMETH-ACRYLATE | | | | | |
| DIVINYLBENZENE | 30 | 9 | 30 | 30 | 30 |
| STYRENE | | | | | |
| TRIMETHYLOLPROPANETRIMETH-ACRYLATE | | | | | |
| SHELL COMPONENT (PART) | | | | | |
| METHYLMETHACRYLATE | 18 | 4 | 18 | 37 | 18 |
| BUTYLACRYLATE | | | | | |
| γ-(METHACRYROXYPROPYLE)TRIMETHOXYSILANE | | | | | |
| ETHYLEACRYLATE | 25 | 5 | 25 | 51 | 25 |
| GLYCIDYLMETHACRYLATE | 7 | 1 | 7 | 8 | 7 |
| STYRENE | | | | | |
| CROSSLINKED PARTICLES OR PIGMENT (PART) | | | | | |
| CALCIUM CARBONATE | | | | | |
| KAOLIN CLAY | | | | | |
| EPOSTER S-12 | | | | | |
| RESIN DISPERSION LIQUID (PART) | | | | | |
| ACRYSET SC-291 | | | | | |
| POLYMERIZATION OR DISPERSION RESULT | POLYMERIZATION GOOD | POLYMERIZATION GOOD | Higher viscosity and gelled during polymerization in the first step. Failed to obtain a resin dispersion liquid. | Numerous suspension polymers produced and precipitated. iven up the evaluation thereafter. | Higher viscosity and gelled during polymerization in the second step. Failed to obtain a resin dispersion liquid. |
| RESULTANT DISPERSION LIQUID NO. | 6' | 7' | | | |
| SOLID CONCENTRATION (%) | 19.9 | 20.0 | | | |
| DISPERSION PARTICLE SIZE (μm) | 0.24 | 0.18 | | 6.79 | |
| TURBIDITY OF DRIED COATING | 4.1 | 0.5 | | | |

EXAMPLE 4

[Liquid A]

| [Liquid A] | |
|---|---|
| 3-(N-cyclohexyl-N-methylamino)-6-methyl-7-anilinofluoran | 30 parts |
| 2% aqueous solution of polyvinyl alcohol PVA-CST | 70 parts |
| [Liquid B] | |
| Bisphenol A | 24 parts |
| Amide stearate | 6 parts |
| 2% aqueous solution polyvinyl alcohol PVA-CST | 70 parts |

The above compositions were dispersed using a sand mill until the particle size was reduced to 1 μm or less so as to obtain liquids A and B. The aqueous resin dispersions (1)–(3) obtained in Examples 1–3, the pigment dispersion resin liquids for comparison (1') and (2') and the aqueous resin dispersion for comparison (3')–(7') obtained in Comparative Examples 1–7 were each used as liquid C. 10 parts of the liquid A, 50 parts of the liquid B and 60 parts of the liquid C were mixed so as to prepare a coating for a heat-sensitive color-developing layer. The coating so prepared was applied to one side of woodfree paper having a basis weight of 50 g/m² so that the coating would be 5 g/m² after drying, and the surface was then dried. Thus, the heat-sensitive recording materials [1]–[3] and the heat-sensitive recording materials for comparison [1']–[7'] were obtained.

The whiteness when applying the coating, water resistance, sticking resistance, printing concentration relating to the thus-obtained heat-sensitive recording materials [1]–[3] and the heat-sensitive recording materials for comparison [1']–[7'] were measured by the use of the following device under the following conditions. The results are shown in Table 2.

Whiteness when applying the coating: Measurement was made by the use of the color difference meter ND-1001 of Nippon Denshoku Kogyo Ltd. and calculation was made from the follwing expression according to the above value so measured.

$$\text{Whiteness}=100-[(100-L)^2+a^2+b^2]^{0.5}.$$

Water resistance: One drop of water was dropped on the surface of the heat-sensitive color-developing layer and rubbed lightly with the bulb of a finger. Water resistance are shown by the number of rubbing times until the surface of the heat-sensitive color-developing layer started to peel off.

Sticking resistance: Printed with the respective printing energies by the use of the heat-sensitive paper printer manufactured by Ohkura Electric Co., Ltd. The printing energies on the levels in which sticking was started were set to be sticking energies.

Printing concentration: Measurement was made by the use of Macbeth densimeter RD-914 manufactured by Kollmorgen Co., Ltd. when printing was performed with a printing energy of 0.5 mJ/dot by the use of the heat-sensitive paper printer manufactured by Ohkura Electric Co., Ltd.

TABLE 2

| HEAT-SENSITIVE RECORDING MATERIAL | DISPERSION LIQUID No. | WHITENESS | WATER RESISTANCE (TIME) | STICKING RESISTANCE (mJ/dot) | PRINTING CONCENTRATION |
|---|---|---|---|---|---|
| [1] | (1) | 88.3 | 200 | 0.75 | 1.67 |
| [2] | (2) | 88.5 | 200 | 0.8 OR MORE | 1.60 |
| [3] | (3) | 88.2 | 200 | 0.8 OR MORE | 1.58 |
| COMPARATIVE EXAMPLE [1'] | (1') | 88.9 | 1 | 0.8 OR MORE | 1.42 |
| COMPARATIVE EXAMPLE [2'] | (2') | 81.2 | 20 | 0.8 OR MORE | 1.50 |
| COMPARATIVE EXAMPLE [3'] | (3') | 78.5 | 30 | 0.8 OR MORE | 1.51 |
| COMPARATIVE EXAMPLE [4'] | (4') | 82.5 | 100 | 0.75 | 1.55 |
| COMPARATIVE EXAMPLE [5'] | (5') | 88.5 | 200 | 0.25 | 1.02 |
| COMPARATIVE EXAMPLE [6'] | (6') | 87.6 | 40 | 0.32 | 1.06 |
| COMPARATIVE EXAMPLE [7'] | (7') | 88.2 | 30 | 0.29 | 1.02 |

EXAMPLE 5

3% glyoxal in terms of solid concentration used as a crosslinking agent was added to the aqueous resin dispersions (1)–(3) for a heat-sensitive recording material, the pigment dispersion resin liquids for comparison (1') and (2') and the aqueous resin dispersions for comparison (3')–(7'). Thus, a coating for a protective coating was prepared. This coating was applied to the surface of the heat-sensitive color-developing layer of the heat-sensitive recording material [1'] so that the coating would be 3 g/m² after drying, and the surface was then dried. After the protective coating was thus formed, the surface was treated by the use of the super calender 30FC–200E manufactured by Kumagai Riki Kogyo Co., Ltd. so as to have a surface smoothness of 3000 seconds or more. As a result, the heat-sensitive recording materials [4]–[6] and the heat-sensitive recording materials for comparison [8']–[14'] were obtained.

Whiteness when applying the coating, surface gloss, water resistance, sticking resistance, printing concentration, comparison [8']–[14'] and the heat-sensitive recording material for comparison [1'] used as a sample not coated with a protective coating were measured by the use of the following device under the following conditions. The results are shown in Table 3.

Surface gloss: Measurement was made at incident angle of 75 by the use of Glossmeter VG-1D of Nippon Denshoku Kogyo Ltd.

Plasticizer resistance: One drop of dibutylphthalate used as a plasticizer was dropped on the printing surface and the time required for the color to start to fade away was shown.

Other tests: Measured by the methods employed in Example 4.

TABLE 3

| HEAT-SENSITIVE RECORDING MATERIAL | PROTECTIVE COATING DISPERSION LIQUID No. | WHITE-NESS | SURFACE GLOSS | WATER RESISTANCE (TIME) | STICKING RESISTANCE (mJ/dot) | PRINTING CONCENTRATION | PLASTICIZER RESISTANCE |
|---|---|---|---|---|---|---|---|
| [4] | (1) | 89.3 | 78 | 500 | 0.8 OR MORE | 1.58 | 24 HOURS OR LONGER |
| [5] | (2) | 89.1 | 83 | 500 | 0.8 OR MORE | 1.61 | 24 HOURS OR LONGER |
| [6] | (3) | 88.7 | 86 | 500 | 0.8 OR MORE | 1.63 | 24 HOURS OR LONGER |
| COMPARATIVE EXAMPLE [8'] | (1') | 89.5 | 15 | 1 | 0.58 | 1.02 | 5 MINUTES |
| COMPARATIVE EXAMPLE [9'] | (2') | 88.5 | 22 | 100 | 0.63 | 1.10 | 3 MINUTES |
| COMPARATIVE EXAMPLE [10'] | (3') | 87.2 | 15 | 100 | 0.68 | 1.05 | 15 MINUTES |
| COMPARATIVE EXAMPLE [11'] | (4') | 85.8 | 85 | 400 | 0.79 | 1.61 | 17 HOURS |
| COMPARATIVE EXAMPLE [12'] | (5') | 88.8 | 82 | 500 | 0.31 | 1.11 | COLOR FADED AWAY AT STICK PORTION |
| COMPARATIVE EXAMPLE [13'] | (6') | 88.8 | 81 | 40 | 0.41 | 1.21 | COLOR FADED AWAY AT STICK PORTION |
| COMPARATIVE EXAMPLE [14'] | (7') | 87.2 | 78 | 50 | 0.35 | 1.15 | COLOR FADED AWAY AT STICK PORTION |
| COMPARATIVE EXAMPLE [1'] | — | 88.9 | 10 | 1 | 0.8 OR MORE | 1.42 | COLOR FADED AWAY IMMEDIATELY | plasticizer resistance relating to the heat-sensitive recording materials [4]–[6], the heat-sensitive recording materials for

EFFECT OF THE INVENTION

As will be clearly understood from the foregoing description, the present invention offers the following advantages.

The aqueous resin dispersion for a heat-sensitive recording material employs a special type of polyvinyl alcohol as an emulsifier, thereby stably performing the two-step polymerization of crosslinked microfine particle components and a binder component. Further, the aqueous resin dispersion is used as a binder resin for a heat-sensitive color-developing layer. Thus, even though generally-used pigments, such as calcium carbonate, are not added at all, or only a slight amount of the pigment is added thereto, it is still possible to obtain a heat-sensitive recording sheet having basic physical properties such as good sticking resistance. Also, a resin coating has high transparency. Hence, the heat-sensitive recording material of the present invention brings about images which excel in surface gloss, printing concentration and printing quality over the images obtained by using the conventional heat-sensitive recording materials. Moreover, polyvinyl alcohol is used as an emulsifier, thus substantially achieving good stability of background which is not attainable by the use of an emulsion polymerized by the conventional emulsifier.

When the aqueous resin dispersion of the present invention is used as a protective coating for a heat-sensitive recording material, the resulting recording material also excels in transparency, surface gloss and sticking resistance. Further, polyvinyl alcohol is used as an emulsifier, and the resulting heat-sensitive recording material shows improved plasticizer resistance almost as good as polyvinyl alcohol itself in comparison to a heat-sensitive recording material obtained by the use of a mixture of a generally-used emulsion and polyvinyl alcohol because polyvinyl alcohol is efficiently present on the surface of the dispersion particles. The protective coating also excels in resistance to water, light, solvents, pressure, and the like.

Since the heat-sensitive recording material particularly excels in surface gloss, printing concentration and plasticizer resistance as stated above, it is very suitable for special use such as labels for POS, prepaid cards, tickets, etc., and for general use such as printing paper for various thermal printers of computers, word processors, facsimiles, handy terminals, image printing, various measuring instruments, cash dispensers, etc.

What is claimed is:

1. An aqueous resin dispersion for a heat-sensitive recording material, said dispersion containing a (modified) polyvinyl alcohol as an emulsifier, said (modified) polyvinyl alcohol having a degree of polymerization within a range from 300–2,400 and a saponification rate of 80% or more, said emulsifier constituting from 10 to 250% by weight of the total weight of monomers, said aqueous resin dispersion being obtained by polymerization wherein, in a first step, a monomer composition A is polymerized, said composition A containing multi-functional monomers and other monomers, said multi-functional monomers having more than one site of ethylenic unsaturation which constitute 15% by weight or more of the total weight of said monomers used for the first step and, said other monomers which are selected so that when a polymer made of said other monomers is produced, said polymer has a glass transition temperature of 70° C. or higher and, in a second step, a monomer composition B is polymerized.

2. The dispersion of claim 1, wherein said multifunctional monomers are selected from the group consisting of multi-functional (meth)acrylates, multifunctional (meth)acrylamides, multifunctional allyl compounds, allyl (meth)acrylate and divinylbenzene.

3. The dispersion of claim 1, wherein said resin in said aqueous dispersion is in the form of core-shell particles having a core of polymer A and a shell of polymer B.

4. The dispersion of claim 3, wherein said core-shell particles have an average particle size of not more than 500 nm.

5. The dispersion of claim 1, wherein said monomer composition B is selected such that the glass transition temperature of said monomer composition B after polymerization is not higher than 90° C.

6. The dispersion of claim 1, wherein the degree of polymerization of said (modified) polyvinyl alcohol is in the range 550–2400.

* * * * *